United States Patent
Elliott et al.

(10) Patent No.: US 7,627,788 B2
(45) Date of Patent: Dec. 1, 2009

(54) RFID ACTIVE/PASSIVE TAG IDENTIFYING FAILED SUB-CRU AND LOCATION WITHIN HIGHER LEVEL CRU

(75) Inventors: John Charles Elliott, Tucson, AZ (US); Robert Akira Kubo, Tucson, AZ (US); Gregg Steven Lucas, Tucson, AZ (US); Andrew Ellis Seidel, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 11/532,398

(22) Filed: Sep. 15, 2006

(65) Prior Publication Data

US 2008/0126886 A1    May 29, 2008

(51) Int. Cl.
*G06F 11/00* (2006.01)

(52) U.S. Cl. ............................. 714/57; 714/27; 714/46; 340/10.1

(58) Field of Classification Search .................. 714/27, 714/46, 57; 340/10.1
See application file for complete search history.

(56) References Cited

U.S. PATENT DOCUMENTS

| | | | |
|---|---|---|---|
| 4,803,592 A | 2/1989 | Ashley | |
| 5,404,503 A | 4/1995 | Hill et al. | |
| 2005/0242925 A1* | 11/2005 | Zaretsky et al. | 340/10.1 |
| 2006/0059390 A1 | 3/2006 | Duron et al. | |
| 2006/0082444 A1 | 4/2006 | Sweeney, II et al. | |
| 2006/0212752 A1* | 9/2006 | Mechalke et al. | 714/7 |

FOREIGN PATENT DOCUMENTS

JP    2001137513    5/2001

* cited by examiner

*Primary Examiner*—Robert Beausoliel
*Assistant Examiner*—Charles Ehne
(74) *Attorney, Agent, or Firm*—Stephen J. Walder, Jr.; Randall J. Bluestone

(57) ABSTRACT

A radio frequency identifier (RFID) active/passive tag is provided to identify failed sub-CRU and location within a higher level CRU. When an error occurs on the base blade or within one of the sub-CRUs, the embedded processor writes failure information to the RFID. RFID tags may also contain data identifying the locations, of the sub-CRUs of the blade. Thus, when there is a failure, the RFID may report the failed component as well as the location of a failed sub-CRU. Sub-CRUs may also include an embedded processor and RFID tag. When a service action is initiated to repair or replace a blade, the RFID tag may be read by a RFID reader. The RFID reader device may then present failure information, including the identification of the failed sub-CRU and other associated information to the operator. The RFID reader device may also request associated information from a server computer.

11 Claims, 4 Drawing Sheets

RFID ACTIVE/PASSIVE TAG IDENTIFYING FAILED SUB-CRU AND LOCATION WITHIN HIGHER LEVEL CRU

BACKGROUND

1. Technical Field

The present application relates generally to an improved data processing system and method. More specifically, the present application is directed to a radio frequency identifier active/passive tag identifying failed sub-CRU and location within a higher level CRU.

2. Description of Related Art

In some systems, a collection of servers is interconnected into a server system, sharing high-speed fabric topologies, such as in BladeCenter® systems. "BladeCenter" is a trademark of International Business Machines Corporation in the United States, other countries, or both. A BladeCenter® system is a server architecture that houses multiple server modules ("blades") in a single chassis. Blade servers are widely used in datacenters to save space and improve system management. Either self-standing or rack mounted, the chassis provides the power supply. Each blade may have its own CPU, memory, and hard disk. Blade servers generally provide their own management systems and may include a network or storage switch.

In a BladeCenter® system, each blade is considered a customer replaceable unit (CRU). Each blade may also have sub-CRUs. Thus, when a blade fails, the failure may be due to a fault on the base blade itself or one of the sub-CRUs. The blade's embedded processor asserts a fault indicator when the failure occurs. If the fault is due to a sub-CRU, the processor identifies the CRU and saves this information to non-volatile memory.

To be able to identify the failed sub-CRU when the blade is removed, the blade implements a voltage source, such as a super capacitor (super cap) or coin cell battery, to power individual indicators and push buttons. The customer removes the blade for service to determine which sub-CRU has failed. The current method is for the customer to press each push button and look for respective indicators to light up. If an indicator lights up, then the corresponding sub-CRU is identified as the failed component. The customer may then replace the identified sub-CRU. If an indicator does not light up, then the customer may infer that the blade is faulty.

This implementation has several disadvantages. The battery or super cap, push buttons, and indicators are costly and take up valuable card real estate. Furthermore, the manual steps for problem determination are time-intensive. Still further, the manual process is prone to human error, as the operator must determine and locate the failed sub-CRUs.

SUMMARY

The illustrative embodiments recognize the disadvantages of the prior art and provide a radio frequency identifier active/passive tag identifying failed sub-CRU and location within a higher level CRU. When an error occurs on the base blade or within one of the sub-CRUs, the embedded processor writes failure information to the RFID. RFID tags may also contain data identifying the locations, such as (x,y) coordinates or a slot identifier, of the sub-CRUs of the blade. Thus, when there is a failure, the RFID may report the failed component, whether it be the base blade itself or a sub-CRU, as well as the location of a failed sub-CRU. Alternatively, sub-CRUs may also include an embedded processor and RFID tag.

When a service action is initiated to repair or replace a blade, the blade is removed and power is lost. At this point, the RFID tag may transition its behavior from an active component to a passive tag, which can be read by a RFID reader. The RFID reader scans the RFID tag, and receives the failure information and other information, such as the locations of the sub-CRU slots. The RFID reader device may then present failure information, including the identification of the failed sub-CRU to an operator.

The RFID reader device may store other information associated with the blade and sub-CRUs. For example, The RFID reader device may store a map of the layout of the blade or instructions for removing the failed sub-CRU from the blade. The RFID reader device may then present the associated information to the operator at the time of repair or replacement. The RFID reader device may also request associated information from a server computer, which may store up-to-date information about the layout of the blade, a map of the blade, instructions for removing the sub-CRU(s), possible reasons for failure, etc.

In one illustrative embodiment, a computer program product comprises a computer useable medium having a computer readable program. The computer readable program, when executed on a computing device, causes the computing device to scan at least one radio frequency identifier within the customer replaceable unit for failure information using a radio frequency identifier reader device, receive the failure information from the at least one radio frequency identifier, identify a failed customer replaceable unit or customer replaceable sub-unit based on the failure information, and present an identification of the failed customer replaceable unit or customer replaceable sub-unit to an operator.

In one exemplary embodiment, the computer readable program further causes the computing device to receive a location of the failed customer replaceable unit or customer replaceable sub-unit from the at least one radio frequency identifier and present a location of the failed customer replaceable unit or customer replaceable sub-unit to the operator.

In another exemplary embodiment, presenting a location of the failed customer replaceable unit or customer replaceable sub-unit comprises displaying a map of the layout of the customer replaceable unit.

In a further exemplary embodiment, the computer readable program further causes the computing device to request from a server other information associated with the failed customer replaceable unit or customer replaceable sub-unit, receive the requested other information from the server, and present the other information associated with the failed customer replaceable unit or customer replaceable sub-unit to the operator. In a still further exemplary embodiment, the other information associated with the failed customer replaceable unit or customer replaceable sub-unit comprises instructions for removing a failed customer replaceable sub-unit.

In yet another exemplary embodiment, scanning at least one radio frequency identifier within the customer replaceable unit for failure information comprises scanning a radio frequency identifier of a customer replaceable sub-unit connected to the customer replaceable unit.

In another illustrative embodiment, a customer replaceable unit comprises an embedded processor, at least one customer replaceable sub-units, and a radio frequency identifier having a memory. Upon an error in the customer replaceable unit or one of the at least one customer replaceable sub-units, the embedded processor writes failure information to the memory of the radio frequency identifier.

In one exemplary embodiment, responsive to losing power on the customer replaceable unit, the radio frequency identifier transitions to a passive mode. In a further exemplary embodiment, responsive to activation by a radio frequency identifier reader device, the radio frequency identifier transmits the failure information to the radio frequency identifier reader device. In a still further exemplary embodiment, responsive to receipt of the failure information, the radio frequency identifier reader device presents an identification of a failed customer replaceable unit or customer replaceable sub-unit to an operator.

In another exemplary embodiment, a given customer replaceable sub-unit from within the at least one customer replaceable sub-units comprises an embedded processor and a radio frequency identifier having a memory. In a further exemplary embodiment, upon an error in the given customer replaceable sub-unit, the embedded processor of the given customer replaceable sub-unit writes failure information to the memory of the radio frequency identifier of the given customer replaceable sub-unit.

In a further illustrative embodiment, a method for identifying a failed customer replaceable unit is provided. The method comprises scanning at least one radio frequency identifier within the customer replaceable unit for failure information using a radio frequency identifier reader device, receiving the failure information from the at least one radio frequency identifier, identifying a failed customer replaceable unit or customer replaceable sub-unit based on the failure information, and presenting an identification of the failed customer replaceable unit or customer replaceable sub-unit to an operator.

In other exemplary embodiments, the method may perform one or more of the operations described above with regard to the computer readable program.

In a further illustrative embodiment, a method for providing a failed customer replaceable unit information service is provided. The method comprises receiving a request from a radio frequency identifier reading device for information associated with a failed customer replaceable unit or customer sub-unit, retrieving the requested information from a database, and returning the retrieved information associated with the failed customer replaceable unit or customer replaceable sub-unit to the requesting radio frequency identifier reading device.

In one exemplary embodiment, the information associated with the failed customer replaceable unit or customer replaceable sub-unit comprises instructions for removing a failed customer replaceable sub-unit.

In another exemplary embodiment, the information associated with the failed customer replaceable unit or customer replaceable sub-unit comprises a map of the layout of a failed customer replaceable unit.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
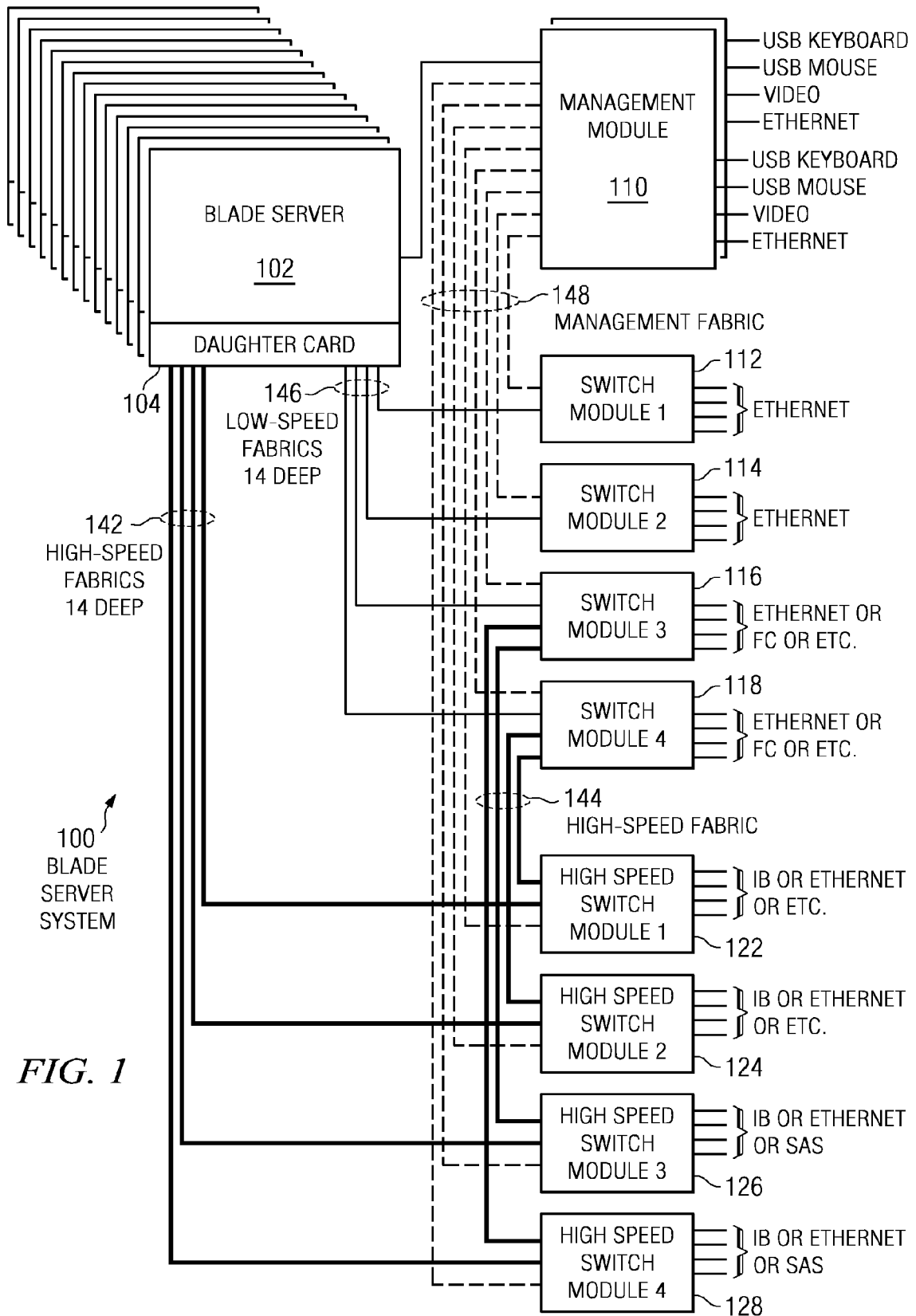
FIG. 1 depicts a pictorial representation of an exemplary blade server system in which aspects of the illustrative embodiments may be implemented.

With reference now to the figures and in particular with reference to FIG. 1, an exemplary diagram of a data processing environment is provided in which illustrative embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environment may be made without departing from the spirit and scope of the present invention.

With reference now to the figures, FIG. 1 depicts a pictorial representation of an exemplary blade server system in which aspects of the illustrative embodiments may be implemented. Blade server system 100 may include a plurality of blade servers 102, each having a corresponding daughter card 104. In the depicted example, blade server system includes fourteen blade servers; however, more or fewer blade slots may be included depending upon the implementation. A server blade may be a processor blade, a storage blade, or the like.

Switch module 1 112 and switch module 2 114 provide connectivity to Ethernet, for example. Switch module 3 and switch module 4 act as switch modules, and provide connectivity to Ethernet, Fibre Channel (FC), SAS, or the like. Blade servers 102 and daughter cards 104 connect to switch modules 112-114 through low-speed fabrics 146 (14 deep for the 14 blade servers in this example).

High speed switch module 1 122 and high speed switch module 2 124 provide connectivity to InfiniBand (IB), Ethernet, or the like. High speed switch module 3 126 and high speed switch module 4 128 provide connectivity to IB, Ethernet, or serial attached small computer systems interface (serial attached SCSI or SAS).

Blade servers 102 and daughter cards 104 connect to high speed switch modules 122-128 via high-speed fabrics 142. These high-speed fabrics are 14 deep for the 14 blade servers in this example.

Blade server system 100 also includes management module 110. Management module 110 performs various management functions for blade server system 100, such as monitoring the system and its associated blade servers 102, daughter cards 104, switch modules 112-118, 122-128, and the like. The components of blade server system 100 are connected to management module 110 through management fabric 148. Management module 110 also aids in identifying failed customer replaceable units (CRUs) for service actions.

Those of ordinary skill in the art will appreciate that the hardware in FIG. 1 may vary depending on the implementation. Other internal hardware or peripheral devices, such as fans, power supplies, and the like, may be used in addition to, or in place of, the hardware depicted in FIG. 1. Also, the processes of the illustrative embodiments may be applied to a data processing system other than the blade server system mentioned above, without departing from the spirit and scope of the illustrative embodiments.

Figure 2A:
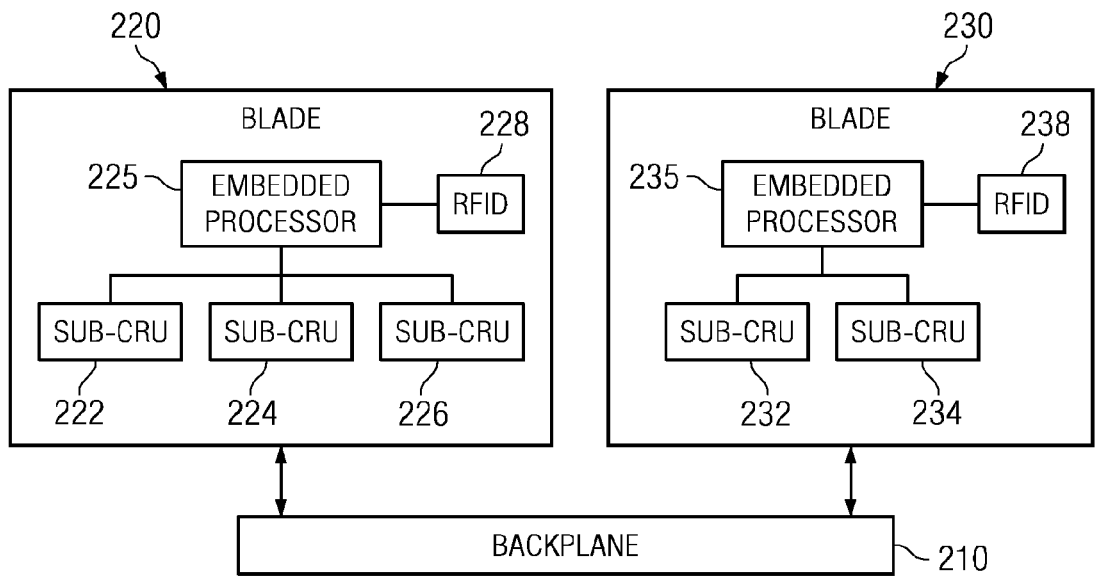
FIG. 2A depicts a blade configuration in accordance with an illustrative embodiment.

FIG. 2A depicts a blade configuration in accordance with an illustrative embodiment. Blade 220 and blade 230 are connected to backplane 210. Blade 220 and blade 230 may be connected to a management module, switch modules, and the like, through backplane 210 via high-speed fabrics, low-speed fabrics, and/or a management fabric, as shown in FIG. 1, for example. Blade 220 and blade 230 may be processor blades, storage blades, other types of blades, or combinations thereof.

Blade 220 and blade 230 are customer replaceable units (CRUs). That is, a customer may remove and replace blade 220 or blade 230 without assistance from the manufacturer. Blade 220 includes embedded processor 225 and sub-CRUs 222, 224, 226. Blade 230 includes embedded processor 235 and sub-CRUs 232, 234. Sub-CRUs 222, 224, 226, 232, and 234 may be, for example, processor modules, memory modules, hard disk drives, daughter cards, other removable modules, or combinations thereof.

In accordance with an illustrative embodiment, blade 220 also includes radio frequency identifier (RFID) tag 228, and blade 230 includes RFID tag 238. A RFID tag, also known as an "electronic label," "transponder," or "code plate," is made up of an RFID chip attached to an antenna. Currently transmitting in the kilohertz, megahertz, and gigahertz ranges, RFID tags may be battery-powered (active) or derive their power from the RF waves coming from the reader (passive).

Like bar codes, RFID tags may identify items. However, unlike bar codes, which must be in close proximity and line of sight to a bar code scanner for reading, RFID tags do not require line of sight and can be embedded within items. Depending on the type of tag and application, RFID tags can be read at a varying range of distances. RFID tags have had many uses, such as identifying personnel, retail products, crates of materials, library books, or even livestock.

"Passive" tags have no power source but use the electromagnetic waves from the reader to energize the chip and transmit back (backscatter) data. "Active" tags have a battery and can actively transmit data to a reader. "Semi-passive" tags, also called "semi-active" tags, combine passive backscattering with a battery that allows the device to beep, blink, or perform some operation.

In the depicted example, RFID tags 228, 238 may be soldered onto the motherboard of blades 220 and 230, respectively, or may be coupled to the blades in some other fashion. RFID tags 228, 238 may be used to store information about the operation of the blades or sub-CRUs. The failure information written to a RFID may include generic information, such as part number or serial number of the sub-CRU, plus fault information, such as failure summary, failure type, time stamp of failure, and so forth.

When an error occurs on the base blade, such as blade 220, or within one of the sub-CRUs, such as sub-CRU 226, for example, the embedded processor 225 writes failure information to the RFID 228. Similarly, embedded processor 235 writes failure information to RFID 238. RFID tags 228, 238 may also contain data identifying the locations, such as (x,y) coordinates or a slot identifier, of the sub-CRUs of the blade. Thus, when there is a failure, the RFID may report the failed component, whether it be the base blade itself or a sub-CRU, as well as the location of a failed sub-CRU.

Figure 2B:
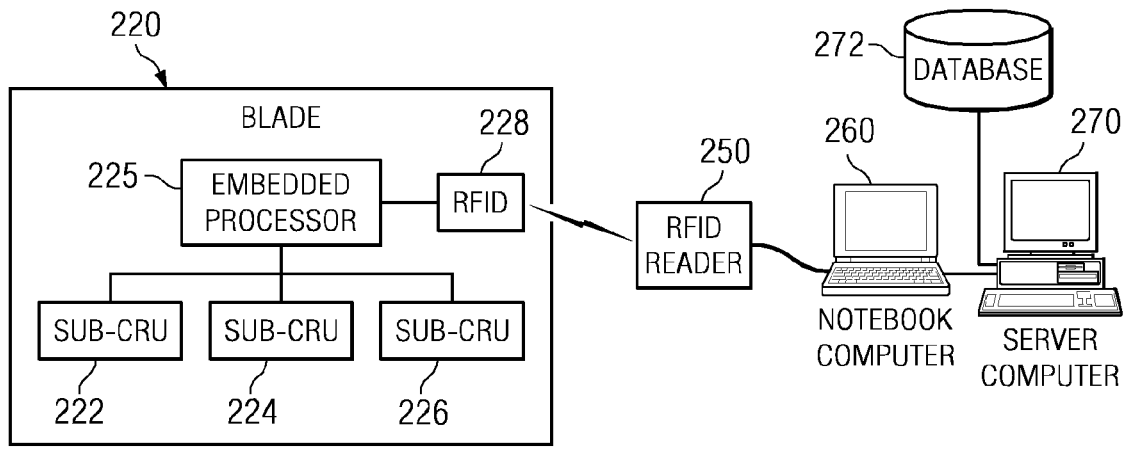
FIG. 2B depicts a RFID reader configuration in accordance with an illustrative embodiment.

FIG. 2B depicts a RFID reader configuration in accordance with an illustrative embodiment. When a service action is initiated to repair or replace a blade, blade 220 is removed and power is lost. At this point, RFID tag 228 transitions its behavior from an active component to a passive tag, which can be read by an RFID reader. In the depicted example, RFID reader 250 is connected to notebook computer 260 as a PCM-CIA or equivalent card. However, in an alternative embodiment, RFID reader 250 may be a stand-alone device or may be connected to a desktop computer, handheld device, or the like.

RFID reader 250 scans RFID tag 228 and notebook computer 260 receives the failure information and other information, such as the locations of the sub-CRU slots. Notebook computer 260 may then present failure information, including the identification and location of the failed sub-CRU to an operator.

Notebook computer 260 may store other information associated with blade 220 and sub-CRUs 222, 224, 226. For example, notebook computer 260 may store a map of blade 220 or instructions for removing the failed sub-CRU from the blade. Notebook computer 260 may then present the associated information to the operator at the time of repair or replacement.

In an alternate embodiment, notebook computer 260 may request associated information from server computer 270. For instance, notebook computer 260 may send a request to server computer 270, where the request identifies the blade and the failed sub-CRU. Server 270 provides access to CRU and sub-CRU information in database 272. Server computer 270 may then send up-to-date information about the layout of the blade, a map of the blade, instructions for removing the sub-CRU(s), possible reasons for failure, etc.

Server 270 may provide a service by providing failure information and associated information responsive to requests from a device equipped with a RFID reader. The operator may scan failure information from a RFID tag within a blade. The device may then make a request to server 270 to obtain more detailed failure information and other associated information about the blade or the failed sub-CRU(s). In this manner, server 270 may provide the most up-to-date and detailed information about the CRUs in the customer's blade server system.

Unlike barcodes, RFIDs can store dynamic content, particularly content that may be inherited from a parent CRU in the depicted examples. RFIDs can also retain that data to aid in failure analysis and associated logistics. In the application to a blade server system, as in the depicted examples, when a CRU is physically removed and no longer has power, the RFIDs can still operate in a passive mode, allowing diagnosis and identification of a failed unit. The failure data may stay with the failed CRU, which allows for further failure analysis after the part is replaced.

In addition, RFID tags are uniquely addressed and do not interfere with one another. All sub-CRUs may be scanned and evaluated for faults in the same step. Furthermore, as electronics chassis employ electromagnetic interference (EMI) suppression to meet Federal Communications Commission (FCC) requirements, a CRU may be removed from the suppression cage for the RFID signal to be scanned. Thus, with the illustrative embodiments, the customer may remove a CRU, such as a blade, to gain access to the RFID tags. Most CRUs or sub-CRUs are not individually encased in additional EMI-suppression structures.

Figure 3:
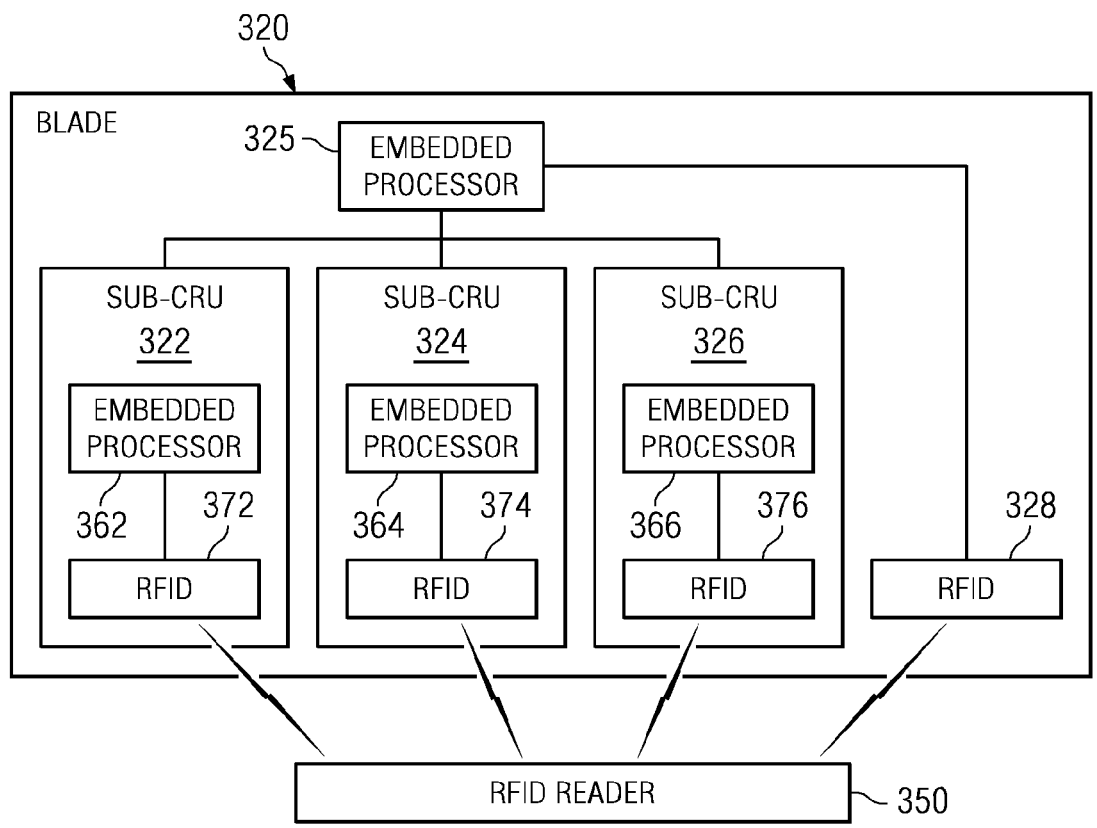
FIG. 3 depicts a RFID reader configuration with RFID tagged sub-CRUs in accordance with an illustrative embodiment.

FIG. 3 depicts a RFID reader configuration with RFID tagged sub-CRUs in accordance with an illustrative embodiment. Blade 320 is a customer replaceable unit (CRU). That is, a customer may remove and replace blade 320 without assistance from the manufacturer. Blade 320 includes embedded processor 325 and sub-CRUs 322, 324, 326. Sub-CRUs 322, 324, and 326 may be, for example, processor modules, memory modules, hard disk drives, daughter cards, other removable modules, or combinations thereof.

In accordance with an illustrative embodiment, blade 320 also includes radio frequency identifier (RFID) tag 328. In addition, sub-CRU 322 includes embedded processor 362 and RFID tag 372, sub-CRU 324 includes embedded processor 364 and RFID tag 374, and sub-CRU 326 includes embedded processor 366 and RFID tag 376. In the depicted example, RFID tags may be soldered onto the blade card or sub-CRU card, or may be coupled to the card in some other fashion. RFID tags 328, 372, 374, 376 may be used to store information about the operation of the blade or sub-CRUs.

When an error occurs on the base blade 320 or within one of the sub-CRUs, such as sub-CRU 326, for example, the embedded processor writes failure information to RFID. For example, if an error occurs in blade 320, embedded processor 325 writes failure information to RFID tag 328. If an error occurs in sub-CRU 326, embedded processor 366 writes failure information to RFID tag 376, and also notifies embedded processor 325 of the failure. RFID tag 328 may also contain data identifying the locations, such as (x,y) coordinates or a slot identifier, of the sub-CRUs of the blade. Thus, when there is a failure, the RFID may report the failed component, whether it be the base blade itself or a sub-CRU, as well as the location of a failed sub-CRU.

When a service action is initiated to repair or replace a blade, blade 320 is removed and power is lost. At this point, RFID tags 328, 372, 374, and 376 transition their behavior from active components to passive tags, which can be read by RFID reader 350. As a further advantage of placing a RFID tag in each sub-CRU, the sub-CRU is removed for failure complete with the failure information stored on the RFID tag. The customer may also return the sub-CRU to the manufacturer, which may then analyze the sub-CRU or refurbish the part. The customer or manufacturer may then analyze the failure information to determine failure patterns, causes of failure, or the like.

FIGS. 2A, 2B, and 3 depict a blade with a plurality of sub-CRUs. However, the aspects of the illustrative embodiments may apply to any CRU with any number of sub-CRUs. Furthermore, one or more of the sub-CRUs may also have sub-CRUs.

Figure 4:
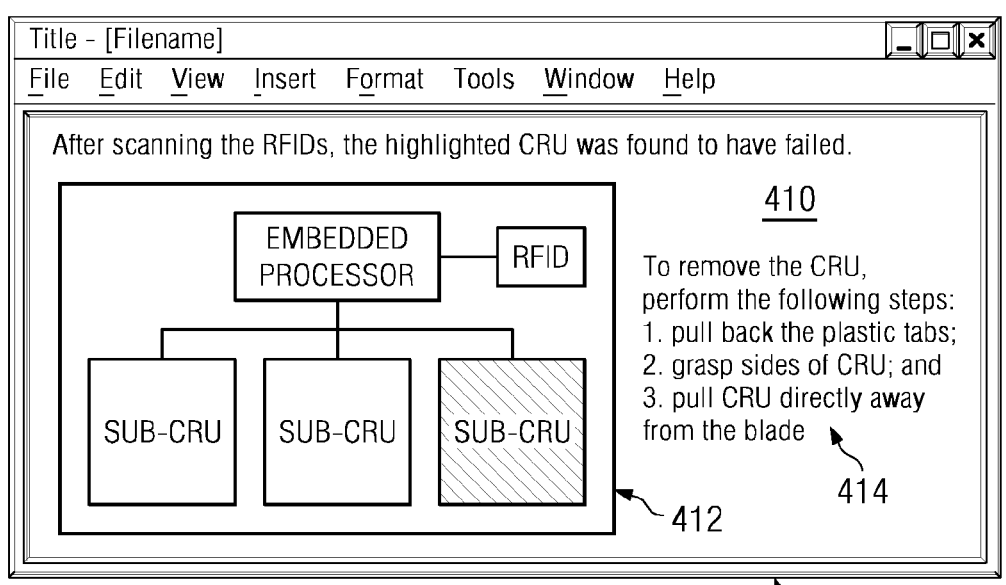
FIG. 4 illustrates an example screen of display for a failed part identification application in accordance with an exemplary embodiment

FIG. 4 illustrates an example screen of display for a failed part identification application in accordance with an exemplary embodiment. Window 400 includes display area 410. After scanning the RFID tag(s) of the blade and/or sub-CRU(s), the failed part identification application presents failure information in display area 410. The failed part information includes an identification of the failed part.

In the depicted example, the failed part information includes map 412, which presents a layout of the blade. Map 412 also includes a highlight 414 of the failed sub-CRU. In addition, the failed part identification application may also present associated information, such as removal instructions 416.

Figure 5:
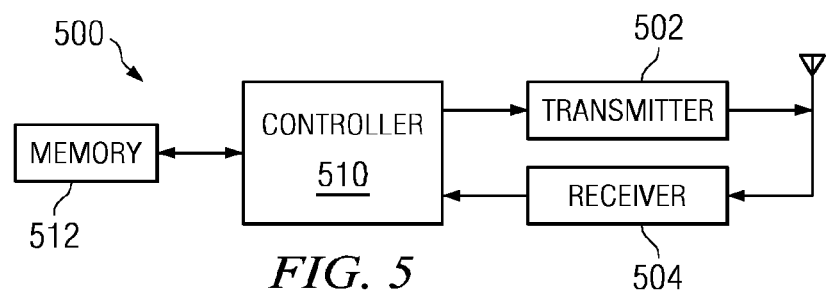
FIG. 5 illustrates a simple RFID device in accordance with an exemplary embodiment.

FIG. 5 illustrates a simple RFID device in accordance with an exemplary embodiment. RFID 500 includes transmitter 502 and receiver 504 that communicate through antenna 506. Controller receives information from receiver 504 and transmits information through transmitter 502. Identification information is stored in memory 512, which may be, for example, a static memory, such as a programmable read-only memory (PROM).

When polled through receiver 504, controller 510 transmits identification information from memory 512 through transmitter 502. RFID 500 may also operate in an active mode when connected to a power supply through the blade or sub-CRU. In active mode, the embedded processor of the blade or sub-CRU may access memory 512 directly or through controller 510.

Figure 6:
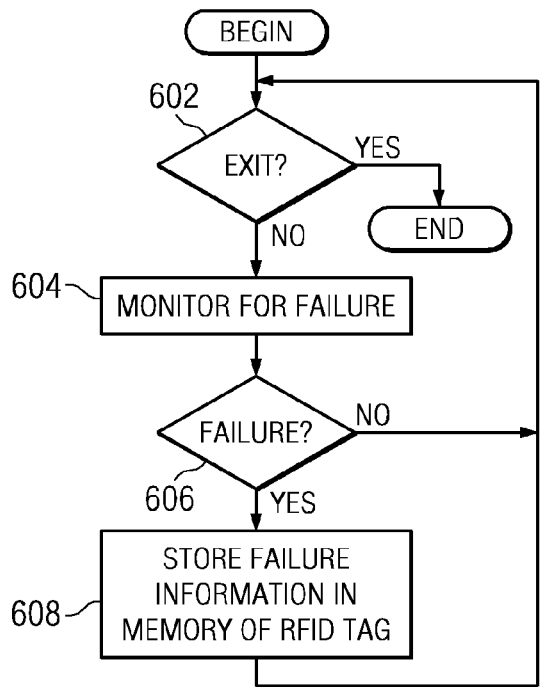
FIG. 6 is a flowchart illustrating the operation of an embedded processor in a CRU or sub-CRU in accordance with an illustrative embodiment.

FIG. 6 is a flowchart illustrating the operation of an embedded processor in a CRU or sub-CRU in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

With reference to FIG. 6, Operation begins and the embedded processor of the CRU or sub-CRU determines whether an exit condition exists (block 602). An exit condition may exist, for example, when power is lost, such as when the blade is removed for repair or replacement. If an exit condition exists, operation ends.

If an exit condition does not exist in block 602, the embedded processor monitors for failure (block 604) and determines whether a failure occurs (block 606). If a failure does not occur, operation returns to block 602 to determine whether an exit condition exists.

If a failure does occur in block 606, the embedded processor stores failure information in the memory of the RFID tag of the CRU or sub-CRU (block 608). Thereafter, operation returns to block 602 to determine whether an exit condition exists. Although not depicted in FIG. 6, if the part is a sub-CRU, the embedded processor may notify the parent CRU of the failure.

Figure 7:
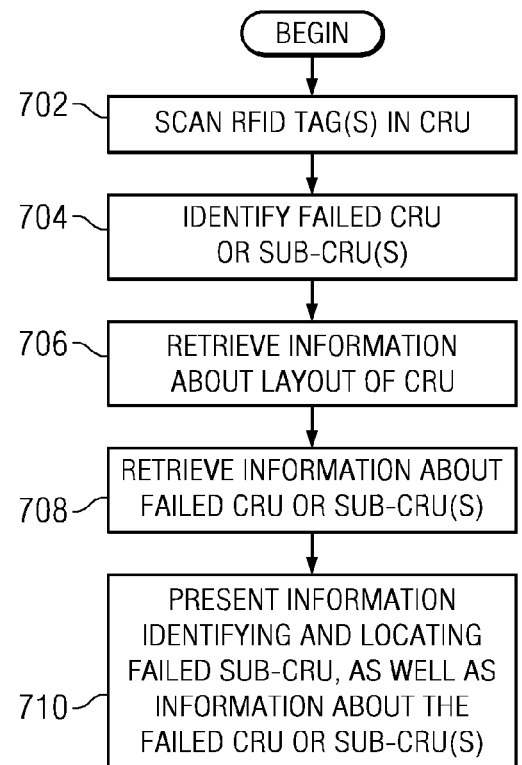
FIG. 7 is a flowchart illustrating operation of a RFID reading device in accordance with an illustrative embodiment.

FIG. 7 is a flowchart illustrating operation of a RFID reading device in accordance with an illustrative embodiment. Operation begins and the RFID reading device scans the RFID tag or tags, in the case of RFID tagged sub-CRUs, in the CRU (block 702). The RFID reading device identifies the failed CRU or sub-CRU based on the failure information read from the RFID tag(s) (block 704). The RFID reading device then retrieves information about the layout of the CRU (block 706) from local memory or from a server or service. The RFID reading device retrieves information about the failed CRU or sub-CRU (block 708). Next, the RFID reading device presents information identifying and locating the failed CRU or sub-CRU, as well as other associated information about the failed CRU or sub-CRU(s) to the operator (block 710). Thereafter, operation ends.

Figure 8:
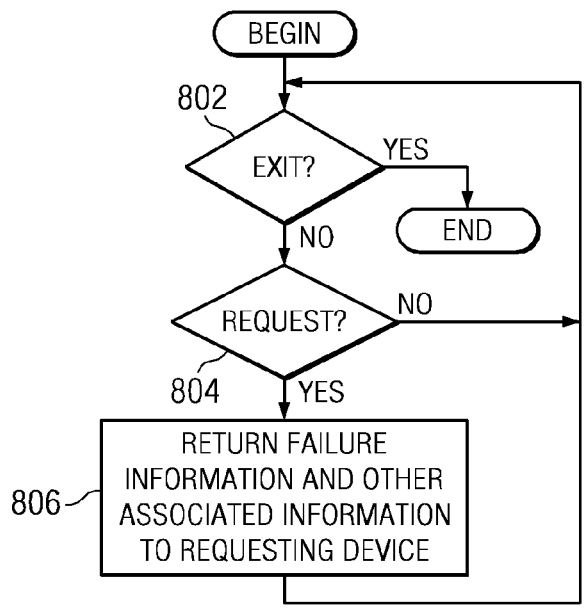
FIG. 8 is a flowchart illustrating the operation of a failed CRU information service in accordance with an illustrative embodiment.

FIG. 8 is a flowchart illustrating the operation of a failed CRU information service in accordance with an illustrative embodiment. Operation begins and the service determines whether an exit condition exists (block 802). An exit condition may exist, for example, if the server providing the service is shut down. If an exit condition exists, operation ends.

If an exit condition does not exist, the service determines whether a request is received from a RFID reading device (block 804). If a request is not received, operation returns to block 802 to determine whether an exit condition exists.

If request is received from a RFID reading device in block 804, the service returns failure information and other associated information to the requesting device (block 806). Thereafter, operation returns to block 802 to determine whether an exit condition exists. The service may retrieve this information from storage based on identifying information in the request, which may include, for example, an identification of the CRU, identification of a failed CRU or sub-CRU, location on the CRU of a failed sub-CRU, and so forth. The associated information may include, for example, a map of the layout of the CRU, instructions on how to prevent failure, instructions for removal of a failed sub-CRU, and the like.

Thus, the illustrative embodiments solve the disadvantages of the prior art by providing a radio frequency identifier active/passive tag identifying failed sub-CRU and location within a higher level CRU. When an error occurs on the base blade or within one of the sub-CRUs, the embedded processor writes failure information to the RFID. RFID tags may also contain data identifying the locations, such as (x,y) coordinates or a slot identifier, of the sub-CRUs of the blade. Thus, when there is a failure, the RFID may report the failed component, whether it be the base blade itself or a sub-CRU, as well as the location of a failed sub-CRU. Alternatively, sub-CRUs may also include an embedded processor and RFID tag.

When a service action is initiated to repair or replace a blade, the blade is removed and power is lost. At this point, the RFID tag may transition its behavior from an active component to a passive tag, which can be read by a RFID reader. The RFID reader scans the RFID tag, and receives the failure information and other information, such as the locations of the sub-CRU slots. The RFID reader device may then present failure information, including the identification of the failed sub-CRU to an operator.

The RFID reader device may store other information associated with the blade and sub-CRUs. For example, The RFID reader device may store a map of the layout of the blade or instructions for removing the failed sub-CRU from the blade. The RFID reader device may then present the associated information to the operator at the time of repair or replacement. The RFID reader device may also request associated information from a server computer, which may store up-to-date information about the layout of the blade, a map of the blade, instructions for removing the sub-CRU(s), possible reasons for failure, etc.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer storage medium having a computer readable program stored therein, wherein the computer readable program, when executed on a computing device, causes the computing device to:

scan at least one radio frequency identifier within a customer replaceable unit for failure information using a radio frequency identifier reader device;

receive the failure information from the at least one radio frequency identifier;

identify a failed customer replaceable unit or customer replaceable sub-unit based on the failure information;

present an identification of the failed customer replaceable unit or customer replaceable sub-unit to an operator;

receive a physical location of the failed customer replaceable unit or customer replaceable sub-unit, within one of a data processing system or the failed customer replaceable unit, from the at least one radio frequency identifier; and present the physical location of the failed customer replaceable unit or customer replaceable sub-unit to the operator, wherein presenting a location of the failed customer replaceable unit or customer replaceable sub-unit comprises displaying a map of the layout of the customer replaceable unit.

2. The computer program product of claim 1, wherein scanning at least one radio frequency identifier within the customer replaceable unit for failure information comprises scanning a radio frequency identifier of a customer replaceable sub-unit connected to the customer replaceable unit.

3. The computer program product of claim 1, wherein the failed customer replaceable unit or customer replaceable sub-unit is a failed customer replaceable sub-unit of a failed customer replaceable unit and wherein presenting the physical location of the failed customer replaceable unit or customer replaceable sub-unit comprises displaying a map of the layout of the failed customer replaceable unit with a physical location of the failed customer replaceable sub-unit being identified in the displayed map.

4. A computer program product comprising a computer storage medium having a computer readable program stored therein, wherein the computer readable program, when executed on a computing device, causes the computing device to:
scan at least one radio frequency identifier within the customer replaceable unit for failure information using a radio frequency identifier reader device;
receive the failure information from the at least one radio frequency identifier;
identify a failed customer replaceable unit or customer replaceable sub-unit based on the failure information;
present an identification of the failed customer replaceable unit or customer replaceable sub-unit to an operator;
request from a server other information associated with the failed customer replaceable unit or customer replaceable sub-unit;
receive the requested other information from the server; and
present the other information associated with the failed customer replaceable unit or customer replaceable sub-unit to the operator.

5. The computer program product of claim 4, wherein the other information associated with the failed customer replaceable unit or customer replaceable sub-unit comprises instructions for removing a failed customer replaceable sub-unit.

6. A method for identifying a failed customer replaceable unit, the method comprising:
scanning at least one radio frequency identifier within the customer replaceable unit for failure information using a radio frequency identifier reader device;
receiving the failure information from the at least one radio frequency identifier;
identifying a failed customer replaceable unit or customer replaceable sub-unit based on the failure information;
presenting an identification of the failed customer replaceable unit or customer replaceable sub-unit to an operator;
receiving a physical location of the failed customer replaceable unit or customer replaceable sub-unit, within one of a data processing system or the failed customer replaceable unit, from the at least one radio frequency identifier; and
presenting the physical location of the failed customer replaceable unit or customer replaceable sub-unit to the operator, wherein presenting a location of the failed customer replaceable unit or customer replaceable sub-unit comprises displaying a map of the layout of the customer replaceable unit.

7. The method of claim 6, wherein the failed customer replaceable unit or customer replaceable sub-unit is a failed customer replaceable sub-unit of a failed customer replaceable unit and wherein presenting the physical location of the failed customer replaceable unit or customer replaceable sub-unit comprises displaying a map of the layout of the failed customer replaceable unit with a physical location of the failed customer replaceable sub-unit being identified in the displayed map.

8. A method for identifying a failed customer replaceable unit, the method comprising:
scanning at least one radio frequency identifier within the customer replaceable unit for failure information using a radio frequency identifier reader device;
receiving the failure information from the at least one radio frequency identifier;
identifying a failed customer replaceable unit or customer replaceable sub-unit based on the failure information;
presenting an identification of the failed customer replaceable unit or customer replaceable sub-unit to an operator;
receiving a physical location of the failed customer replaceable unit or customer replaceable sub-unit, within one of a data processing system or the failed customer replaceable unit, from the at least one radio frequency identifier;
presenting the physical location of the failed customer replaceable unit or customer replaceable sub-unit to the operator;
requesting from a server other information associated with the failed customer replaceable unit or customer replaceable sub-unit;
receiving the requested other information from the server; and
presenting the other information associated with the failed customer replaceable unit or customer replaceable sub-unit to the operator.

9. The method of claim 8, wherein the other information associated with the failed customer replaceable unit or customer replaceable sub-unit comprises instructions for removing a failed customer replaceable sub-unit.

10. A method for providing a failed customer replaceable unit information service, the method comprising:
receiving a request from a radio frequency identifier reading device for information associated with a failed customer replaceable unit or customer replaceable sub-unit;
retrieving the requested information from a database; and
returning the retrieved information associated with the failed customer replaceable unit or customer replaceable sub-unit to the requesting radio frequency identifier reading device, wherein the information associated with the failed customer replaceable unit or customer replaceable sub-unit comprises instructions for removing a failed customer replaceable sub-unit.

11. The method of claim 10, wherein the information associated with the failed customer replaceable unit or customer replaceable sub-unit comprises a map of the layout of a failed customer replaceable unit.

* * * * *